Jan. 4, 1949.  E. F. ROSSMAN  2,458,206

SHOCK ABSORBER

Filed May 2, 1946

INVENTOR
EDWIN F. ROSSMAN
BY
HIS  ATTORNEYS

Patented Jan. 4, 1949

2,458,206

UNITED STATES PATENT OFFICE 2,458,206

SHOCK ABSORBER

Edwin F. Rossman, Dayton, Ohio, assignor to General Motors Corporation, Detroit, Mich., a corporation of Delaware Application May 2, 1946, Serial No. 666,716

1 Claim. (Cl. 188—88)

This invention relates to improvements in hydraulic shock absorbers, particularly of the direct acting type.

It is among the objects of the present invention to provide a direct acting, hydraulic shock absorber with a protective envelope so constructed and arranged that accumulated mud and dirt between the main body of the shock absorber and said envelope will automatically be ejected and so that certain elements of the shock absorber are easily available for assembling and disassembling purposes.

A further object of the present invention is to provide a direct acting, hydraulic shock absorber with a sturdy and simple mechanism for clamping and sealing the cylinder head and its packing gland in position.

Further objects and advantages of the present invention will be apparent from the following description, reference being had to the accompanying drawing wherein a prefered embodiment of the invention is clearly shown.

Figure 1:
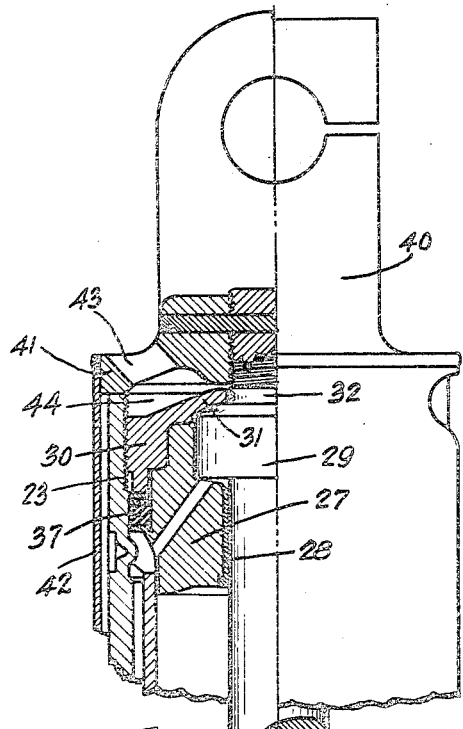
Fig. 1 is a plan view of the shock absorber.
Figure 1:
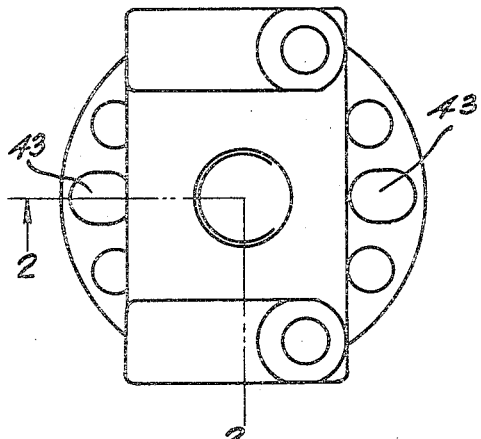

Referring to the drawing, the numeral 20 designates a tube having a closure member 21 attached to its one end in any suitable manner, preferably by welding. This member 21 provides the mounting lug 22 by means of which tube 20 may be attached to the axle of a vehicle when the shock absorber is mounted on the vehicle for controlling the approaching and separating movements of the frame and axle of the vehicle. At the end of tube 20, opposite the closure member 21, interior threads 23 are provided. Within the closure member 21 there is supported a ring-shaped valve cage 24 which cooperates with any suitable valve mechanism 25. One end of a cylinder 26 is supported upon the valve cage 24, the other end of said cylinder having a head member 27. This head member has a central opening lined with a sleeve bearing 28 and recessed at its outer end to receive and hold the packing gland 29. A clamping nut 30 is threadedly received by the tube 20, said nut engaging the head member 27 urging it downwardly into the cylinder 26 and the cylinder in turn clamped upon the valve cage 24 so that this cylinder 26 is rigidly held concentric within the tube 20. Nut 30 has a dome-like central portion 31 which engages and covers the packing gland 29 and protects it. A piston rod 32 slidably extends through the packing 29 and the sleeve bearing 28 into the cylinder and has a piston 33 attached thereto for reciprocation within the cylinder 26. Any suitable packing ring 37 is engaged and pressed by the nut 30 so as to provide a seal between the head member 27 and the tube 20.

The piston rod 32 extends outside the packing gland 29 and is attached to the mounting lug 40 which is adapted to secure this end of the shock absorber to the frame of the vehicle upon which it is installed. This lug or fixture 40 has an annular or disclike base 41 to which a tube 42 is secured, this tube acting as a skirt surrounding the tube 20 for a portion of its length and acting as a protection for said tube. A plurality of openings 43 are provided in the base 41 of the fixture 40 and render accessible, ribs 44 provided on the top surface of the clamping nut 30.

Figure 2:
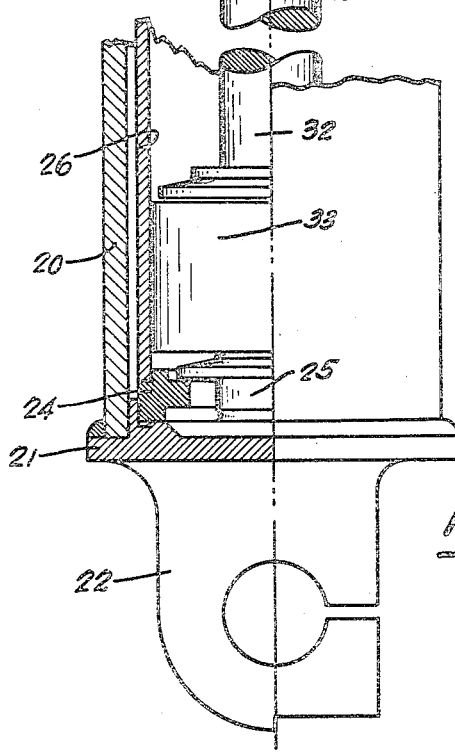
Fig. 2 is a quarter sectional view taken along the line 2—2 of Fig. 1.

From Fig. 2 it will be seen that the interior surface of the base 41 of the mounting lug 40 and the exterior surface of the clamping nut 30 including its domelike portion 31 are so shaped as to present a tapering space therebetween, these surfaces, when the fixture 40 is in close proximity to the nut 30, being in closer proximity in the area surrounding the piston rod than in the area adjacent the openings 43 in said fixture. When dirt accumulates in this space it will be crushed and pulverized as the fixture moves into close proximity with the nut and due to the tapering surface the crushed dirt will be urged toward the openings 43 from which said dirt is then ejected. It will be seen that the dome-like portion 31 of the nut protects the packing gland 29 and the adjacent portion of the shaft sliding therein from damage as the dirt is crushed between the nut 30 and the approaching fixture base 41. Without the provision of the openings 43 and the peculiar conformation of the space between the fixture 43 and the nut dirt would be permitted to accumulate and build up a solid formation which gradually would tend to shorten the compression stroke of the shock absorber and eventually cause damage therein. However, under the present design this dirt is constantly being broken up and ejected and thereby eliminating such damaging accumulation at this point of the device. The openings 43 not only provide means through which accumulated dirt may be ejected but it also permits the insertion of a tool such as a spanner wrench for engaging the ribs 44 on the nut to actuate said nut within the tube 20 by rotation of the fixture 41 relatively to the tube 20.

From the foregoing it may be seen that applicant has provided an improved structure in a shock absorber by means of which damaging accumulation of dirt, stones and the like is entirely eliminated.

While the embodiment of the present as herein disclosed, constitutes a preferred form, it is to be understood that other forms might be adopted, all coming within the scope of the claim which follows.

What is claimed is as follows:

A hydraulic shock absorber comprising an outer shell provided with a head member through which a piston rod slidably extends; a plate secured to the outer end of said piston rod, said plate having openings adjacent its outer edge and a skirted member which envelopes the said shell for a portion of its length, the adjacent surfaces of the head member and the plate sloping relatively so as to be in closer proximity in the area surrounding the piston rod than at the openings in said plate; and ribs in the head member, said ribs facilitating securing the head member to the shell and forming means to break up mud accumulating under the plate.

EDWIN F. ROSSMAN.

REFERENCES CITED

The following references are of record in the file of this patent:

UNITED STATES PATENTS

| Number | Name | Date |
|---|---|---|
| 2,117,837 | Casper | May 17, 1938 |
| 2,144,583 | Focht | Jan. 17, 1939 |
| 2,199,880 | Elliot | May 7, 1940 |